(12) United States Patent
Agarwal et al.

(10) Patent No.: US 11,669,366 B2
(45) Date of Patent: *Jun. 6, 2023

(54) REDUCTION OF A NUMBER OF STAGES OF A GRAPH STREAMING PROCESSOR

(71) Applicant: Blaize, Inc., El Dorado Hills, CA (US)

(72) Inventors: Lokesh Agarwal, Hyderabad (IN); Sarvendra Govindammagari, Hyderabad (IN); Venkata Ganapathi Puppala, Hyderabad (IN); Satyaki Koneru, Folsom, CA (US)

(73) Assignee: Blaize, Inc., El Dorado Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,476

(22) Filed: Jul. 16, 2022

(65) Prior Publication Data

US 2022/0350653 A1 Nov. 3, 2022

Related U.S. Application Data

(63) Continuation of application No. 16/398,567, filed on Apr. 30, 2019, now Pat. No. 11,436,045, which is a continuation-in-part of application No. 16/270,766, filed on Feb. 8, 2019, now Pat. No. 11,150,961, which is a continuation-in-part of application No. 15/164,848, filed on May 25, 2016, now Pat. No. 10,437,637.

(60) Provisional application No. 62/166,507, filed on May 26, 2015.

(51) Int. Cl.
*G06F 9/48* (2006.01)
*G06F 9/38* (2018.01)
*G06F 16/901* (2019.01)
*G06T 1/20* (2006.01)

(52) U.S. Cl.
CPC .......... *G06F 9/4881* (2013.01); *G06F 9/3851* (2013.01); *G06F 9/3885* (2013.01); *G06F 16/9024* (2019.01); *G06T 1/20* (2013.01)

(58) Field of Classification Search
CPC .... G06F 9/4881; G06F 9/3851; G06F 9/3885; G06F 16/9024; G06T 1/20
See application file for complete search history.

(56) References Cited

U.S. PATENT DOCUMENTS

| 7,140,019 | B2 | 11/2006 | May et al. |
| 7,856,544 | B2 | 12/2010 | Schenfeld et al. |
| 8,094,158 | B1 | 1/2012 | Allen et al. |
| 8,291,006 | B2 | 10/2012 | Andrade et al. |
| 9,032,165 | B1 * | 5/2015 | Brooker ................. G06F 13/10 |
| | | | 711/154 |

(Continued)

*Primary Examiner* — Jacinta M Crawford
*Assistant Examiner* — Donna J. Ricks
(74) *Attorney, Agent, or Firm* — Brian R. Short

(57) ABSTRACT

Methods, systems, and apparatuses for graph streaming processing system are disclosed. One system includes a plurality of graph streaming processors operative to process a plurality of threads, wherein the plurality of threads is organized as nodes. The system further includes a scheduler that includes a plurality of stages. Each stage includes a command parser operative to interpret commands within a corresponding input command buffer, an alternate command buffer, and a thread generator coupled to the command parser. The thread generator is operative to generate the plurality of threads, and dispatch the plurality of threads, where the processing of the plurality of thread for each stage includes storing write commands in the corresponding output command buffer or in the alternate command buffer.

20 Claims, 8 Drawing Sheets

(56) References Cited

U.S. PATENT DOCUMENTS

| | | |
|---|---|---|
| 9,367,658 B2 | 6/2016 | Pell et al. |
| 9,639,589 B1* | 5/2017 | Theimer ................. G06F 21/00 |
| 10,423,558 B1 | 9/2019 | Fukami et al. |
| 11,436,045 B2* | 9/2022 | Agarwal ............... G06F 9/3851 |
| 2005/0060518 A1 | 3/2005 | Augsburg et al. |
| 2006/0149938 A1 | 7/2006 | Jiang et al. |
| 2011/0072211 A1 | 3/2011 | Duluk, Jr. et al. |
| 2011/0072245 A1* | 3/2011 | Duluk, Jr. ............... G06F 9/461 |
| | | 712/220 |
| 2011/0087864 A1 | 4/2011 | Duluk, Jr. et al. |
| 2011/0289507 A1 | 11/2011 | Khan et al. |
| 2013/0013898 A1 | 1/2013 | Merten et al. |
| 2013/0036409 A1 | 2/2013 | Auerbach et al. |
| 2013/0212341 A1 | 8/2013 | Tardif et al. |
| 2013/0305258 A1 | 11/2013 | Durant |
| 2014/0082118 A1* | 3/2014 | Chan ................... H04L 49/9094 |
| | | 709/212 |
| 2014/0176588 A1 | 6/2014 | Dulak, Jr. et al. |
| 2014/0181806 A1 | 6/2014 | Abiezzi et al. |
| 2014/0208074 A1* | 7/2014 | Babayan ............... G06F 9/3857 |
| | | 712/206 |
| 2014/0282601 A1 | 9/2014 | Abdallah et al. |
| 2015/0205590 A1* | 7/2015 | Sabne ..................... G06F 8/456 |
| | | 717/149 |
| 2015/0347509 A1* | 12/2015 | Ahmed ................. G06F 9/5033 |
| | | 707/718 |
| 2016/0246599 A1 | 8/2016 | Johnson |
| 2016/0291982 A1 | 10/2016 | Mizrahi et al. |
| 2017/0329643 A1* | 11/2017 | Wang ................... G06F 9/5038 |
| 2018/0300933 A1 | 10/2018 | Burke et al. |
| 2018/0308195 A1 | 10/2018 | Vembu et al. |

* cited by examiner

REDUCTION OF A NUMBER OF STAGES OF A GRAPH STREAMING PROCESSOR

RELATED APPLICATIONS

This patent application is continuation of U.S. patent application Ser. No. 16/398,567, filed Apr. 30, 2019, which is a continuation-in-part (CIP) of U.S. patent application Ser. No. 16/270,766, filed Feb. 8, 2019, which is a continuation-in-part (CIP) of U.S. patent application Ser. No. 15/164,848, filed May 25, 2016, which claims priority to provisional patent application 62/166,507, filed May 26, 2015, which are all herein incorporated by reference.

FIELD OF THE EMBODIMENTS

The described embodiments relate generally to graph stream processing. More particularly, the described embodiments relate to methods, apparatuses, and systems for reduction of the number of stages of a graph streaming processor.

BACKGROUND

The onset of computation heavy applications is causing a paradigm shift from centralized computing to parallel and distributed computing. Parallel computing includes distributing computing jobs to the various computing resources. These resources include several central processing units (CPU), memory, storage, and support for networking.

Centralized computing works well in many applications, but falls short in the execution of computation rich applications, which are increasingly popular. Programs can be executed in a serial fashion or distributed to be executed on multiple processors. When programs are executed in a serial fashion, only one processor can be utilized and hence the throughput is limited to the speed of the processor. Such systems with one processor are adequate for many applications but not for compute intensive applications. Code can be executed in parallel in multi-processor systems leading to higher throughput. Multi-processor systems entail breaking of code into smaller code blocks and efficiently managing the execution of code. In order for the processors to execute in parallel, data to each of the processors has to be independent. Instances of a same code block can be executed on several processors simultaneously to improve the throughput.

It is desirable to have a method, apparatus and system for improving the processing of threads of a multi-thread processing system.

SUMMARY

One embodiment includes a graph streaming processing system. The system includes a plurality of graph streaming processors operative to process a plurality of threads, wherein each of the plurality of threads include a set of instructions operating on the plurality of graph streaming processors, wherein the plurality of threads are organized as nodes, wherein each node includes one or more of the plurality of threads with each thread of the node running the same code block operating on a set of input data and producing (possibly different) output data than other threads of the node. The system further includes a scheduler that includes a plurality of stages, wherein each of the plurality of stages includes an input command buffer and an output command buffer. Each stage includes a command parser operative to interpret commands within a corresponding input command buffer, an alternate command buffer, and a thread generator coupled to the command parser. The thread generator is operative to generate the plurality of threads, and dispatch the plurality of threads for operating on the plurality of graph streaming processors, where the processing of the plurality of thread for each stage includes storing write commands in the corresponding output command buffer when a first node of the plurality of threads of the stage writes greater than a threshold number of write commands for at least one node of a next stage, and storing the write commands in the alternate command buffer of the stage when a second node of the stage writes less the threshold number of write commands for at least one other node of the stage.

Another embodiment includes a method of graph streaming processing system. The method includes processing, by a plurality of graph streaming processors, a plurality of threads, wherein each of the plurality of threads include a set of instructions operating on the plurality of graph streaming processors, wherein the plurality of threads are organized as nodes, wherein each node includes one or more of the plurality of threads with each thread of the node running the same code block operating on a set of input data and producing (possibly different) output data than other threads of the node. The method further interpreting, by a command parser of each of a plurality of stages of a scheduler of the graph streaming processing system, commands within a corresponding input command buffer, wherein each of the plurality of stages includes an input command buffer and an output command buffer, generating, by a thread generator coupled to the command parser, the plurality of threads, and dispatching, by a thread manager, the plurality of threads for operating on the plurality of graph streaming processors. The processing of the plurality of thread for each stage includes storing write commands in the corresponding output command buffer when a first node of the plurality of threads of the stage writes greater than a threshold number of write commands for at least one node of a next stage, and storing the write commands in the alternate command buffer of the stage when a second node of the stage writes less the threshold number of write commands for at least one other node of the stage.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in methods, apparatuses and systems for reducing the number of stages used for graph stream processing. For an embodiment, the graph stream processing enables processing applications in a streaming fashion. At least some embodiments include node-at-a-time execution is effectively includes processing of single node graphs which results in coarse-grained dataflow between the graphs. That is, an entire node is run to completion and outputs of the nodes are generated before scheduling and execution of the next node.

For at least some embodiments, hardware-managed scheduling and processing of multi-node graphs allows for fine-grained scheduling and data movement between the nodes within the graph. In Graph Streaming Processors (GSP), there is a finite amount of scheduling hardware which limits the depth of the graphs that can be executed. As a result, graphs have to be split into sub-graphs. At least some of the described embodiments include virtual staging which helps to execute larger graphs, resulting in better performance. Neural networks are a prime example of applications with graphs of considerable depth which benefit from these enhancements.

Figure 1:
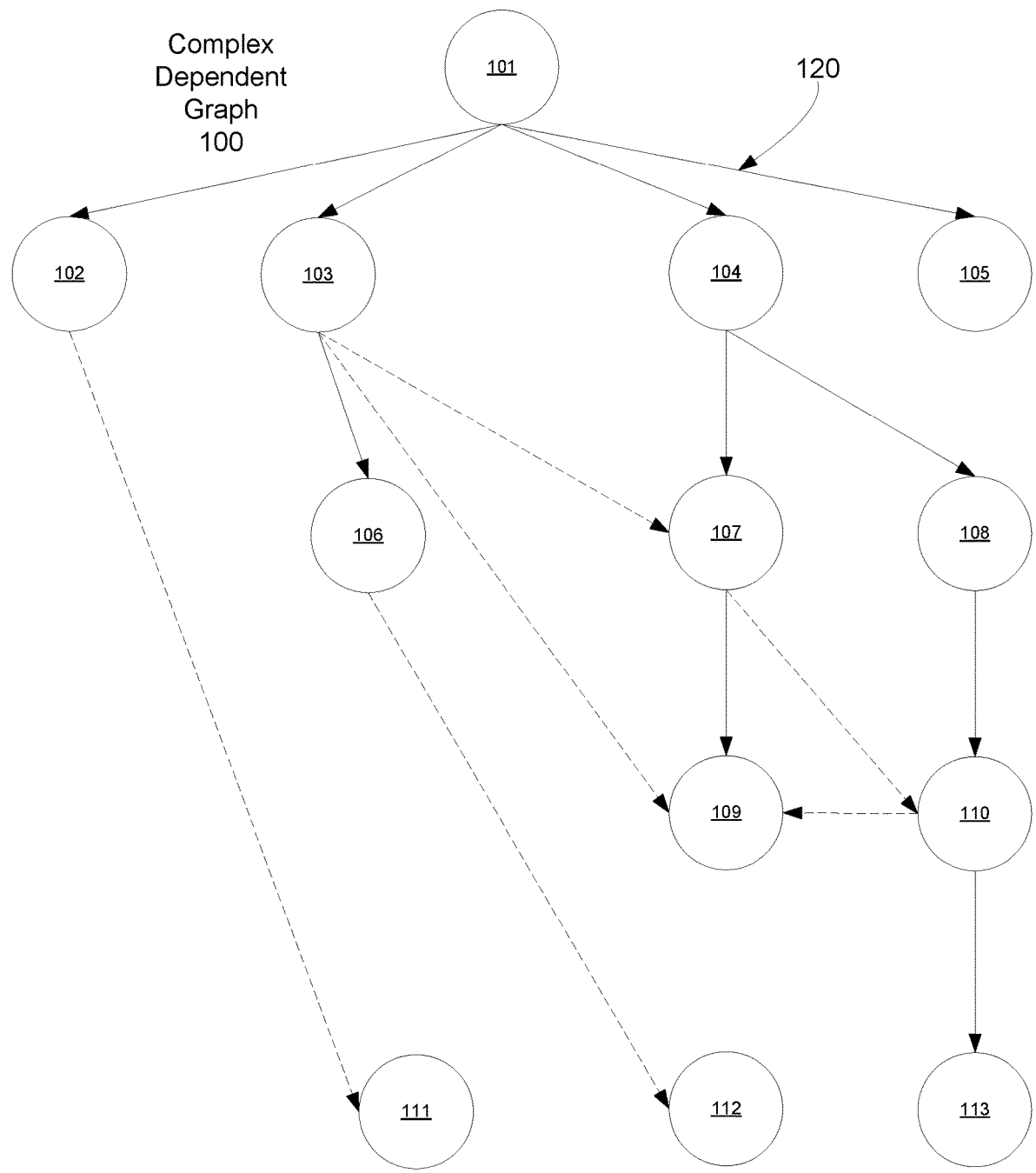
FIG. 1 shows a complex dependent graph, according to an embodiment.

For at least some embodiments, threads of graph stream processing can be represented by a complex dependent graph. FIG. 1 shows a complex dependent graph 100, according to an embodiment. For an embodiment, nodes 101-113 represent a part or portion of application processing isolated into a kernel. For an embodiment, a node or task includes a code-block along with the inputs, and outputs. For an embodiment, a node includes one or more threads with each thread running the same code-block operating on a set of input data and producing (possibly) different output data.

Each of the nodes 101-113 may be processed in parallel with multiple threads, wherein each thread may or may not be dependent on the processing of one or more other threads. As shown in the complex dependent graph 100, the nodes 101-113 are connected through arcs (for example, arc 120) which reflect the dependencies between the nodes 101-113. A thread may be dependent on data generated by other threads of the same node, and/or data generated by threads of other nodes. For an embodiment, each node is processed at a depth, which can be represented by an acyclic graph. For an acyclic graph as represented by the complex dependent graph 100, a node is dependent only on nodes at a lower (that is, dispatched earlier in time from a previous stage) or same depth (dispatched earlier in time but from the same stage).

For an embodiment, applications running on a graph streaming processor can be represented as a graph of nodes. Often, the applications can be fragmented and the graph is composed of multiple nodes which are connected to each other via data dependencies. For an embodiment, each node includes a code block and represents a kernel. If this code block is inside a loop, multiple instances of this node would need to be run. The kernels are capable of issuing commands for scheduling thread instances for the downstream dependent nodes. As described, for at least some embodiments, the graph streaming processor includes a scheduler that is responsible for generating and managing these thread instances of different nodes of the graph. The scheduler is composed of physical hardware stages each of which schedules the threads for all the nodes at a particular depth in the graph.

For at least some embodiments, the graph streaming processor processes the graph which is constructed with nodes. For an embodiment, each node denotes a kernel to execute. For an embodiment, the kernel is a set of instructions. For an embodiment, once a thread of a node completes, the thread generates new thread of a bottom node with "Emit" instruction. Once the processor hits this instruction it generates a new thread by sending this information to the scheduler which in turn dispatches it. All the internode communication of commands happens through command buffer, which stores the information needed to create and dispatch new threads. For an embodiment of a graph streaming processor, each physical stage is associated with unique stage ID. For an embodiment, each thread generated by that stage carries its stage ID.

At least some embodiments of graph streaming processing include limitations on the depth of the graph of the application being processed by the graph streaming processing. The depth of the graph is limited by the number of physical stages and command buffers available. If an application has more number of nodes (depth wise i.e. more than number of physical stages) then the application is divided into multiple graphs which severely hampers the performance. The described embodiments which include merging nodes into stages address the performance issues.

For an embodiment, a thread includes a set of instructions operating on input data and producing output data. A node can include multiple threads wherein all threads run the same set of instructions operating on a set of input data and producing (possibly) different output data. For an embodiment, the threads are executed on a plurality of thread processors. For at least some embodiments, the uncle/s, cousin/s and sibling/s are always older in the dispatch sequence relative to the child thread.

For at least some embodiments, each stage includes an input command buffer parser, wherein the input command buffer parser generates the threads of the stage based upon commands of a command buffer located between the stage and the previous stage.

Figure 2:
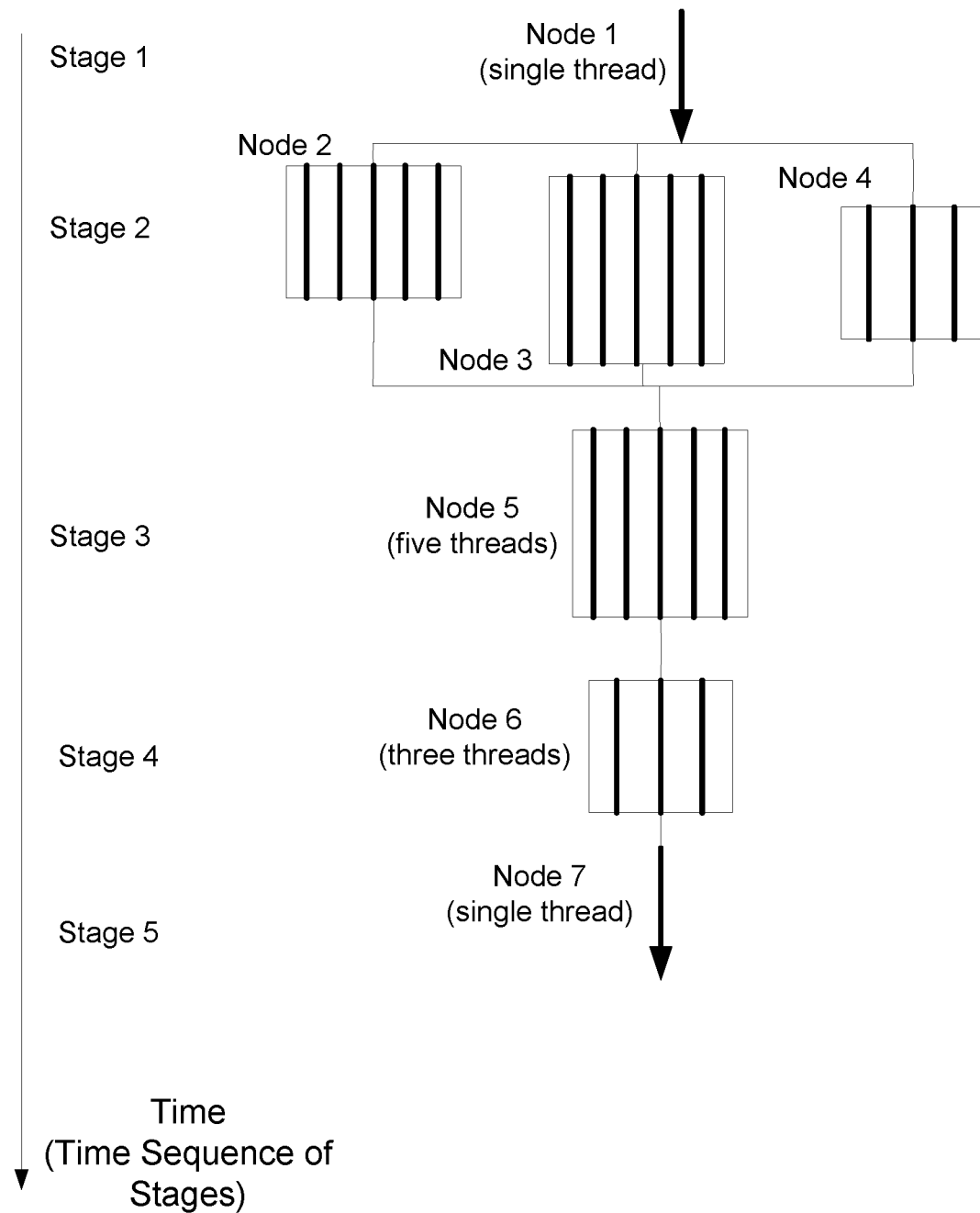
FIG. 2 shows a representation of multiple stages of graph stream processing including multiple threads, according to an embodiment.

FIG. 2 shows a representation of multiple stages of graph stream processing including multiple threads, according to an embodiment. As shown, the multiple stages include, for example, a stage 1, a stage 2, a stage 3, a stage 4, and a stage 5. As shown, each of the stages includes one or more nodes, wherein each node includes one or more streams. For an embodiment, a stream includes a code-block operating on the one or more processors of the graph streaming processor. Further, as previously described, each stage of the graph streaming processor includes a physical piece of hardware in a thread manager which is responsible for scheduling the threads corresponding to the node/s at a particular depth (as determined by timing of the stage relative to other stages) in the graph. For an embodiment, the stage includes an input command buffer parser, wherein the input command buffer parser generates the threads of the stage based upon commands of a command buffer located between the stage and the previous stage. Further, as described, a node includes one or more code blocks that operate as the stream(s) when executed on the plurality of processors of the graph streaming processor.

As shown in FIG. 2, the stage 1 includes a single node (Node 1) that includes, for example, a single thread operating on the plurality of processors. The stage 2 includes a plurality of nodes (Node 2, Node 3, Node 4), wherein the Node 2 includes 5 threads operating on the plurality of processors, the Node 3 includes 5 threads operating on the plurality of processors, and the Node 4 include 3 threads operating on the plurality of processors. Note that the threads of Nodes 2, 3, 4 start and end at different times within the stage 2. The stage 3 includes Node 5 that include 5 threads, stage 4 includes Node 6 that includes 2 threads, and stage 5 includes Node 7 that includes a single thread.

Figure 3:
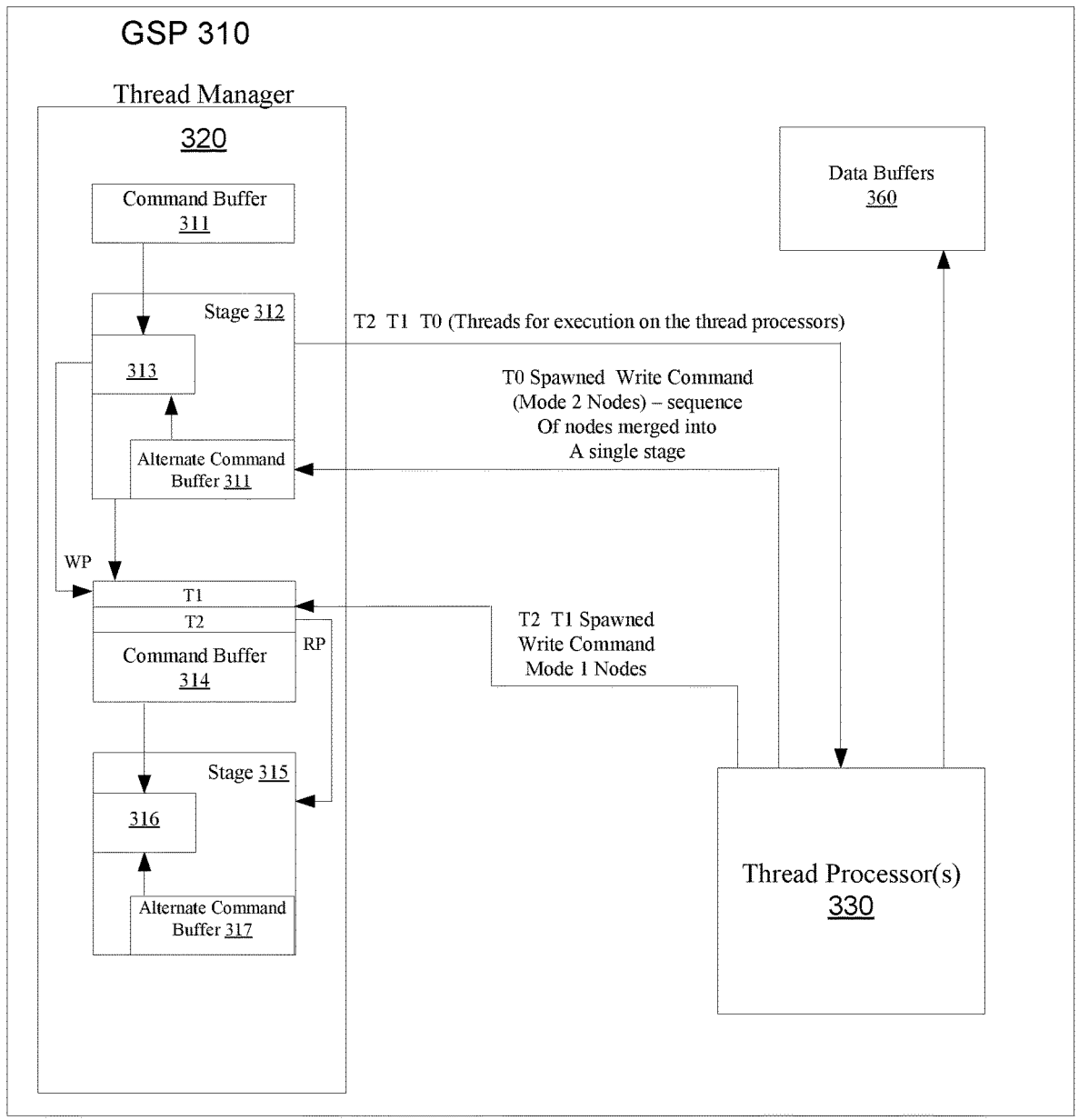
FIG. 3 is a block diagram of a graph streaming processor, according to an embodiment.

FIG. 3 is a block diagram of a graph streaming processor 310, according to an embodiment. As described, for an embodiment, the graph streaming processor 310 operates to process a plurality of threads of a plurality of thread processors 330. As previously described, each thread includes a set of instructions operating on the plurality of thread processors 330 and operating on a set of input data and producing (possibly) different output data.

The graph streaming processor 310 includes a thread manager 320, wherein the thread manager 320 includes stages 312, 315, wherein each of the stages include an interface to a command buffer 311, 314 of a previous stage to an input command buffer parser 313, 316 of the stages 312, 315. As previously described, for an embodiment, each stage 312, 315 of the graph streaming processor includes a physical piece of hardware in the thread manager which is responsible for scheduling the threads. For an embodiment, each stage 312, 315 includes the input command buffer parser 313, 316, wherein the command buffer parser 313, 316 generates the threads of the stage 312, 315 based upon commands of a command buffer 311, 314 located between the stage and the previous stage. The command buffers have commands written into them that provides parallel processing and trigger threads for later occurring stages.

Further, for at least some embodiments, the stages 312, 315 include an alternate command buffer 311, 317. As will be described, the alternate command buffers 311, 317 provide the thread manager 320 with the capability to merge nodes into stages, which allows for a reduction in the total number of stages required to perform the graph streaming processing. The merging of stages reduces the circuitry required to perform the graph streaming processing.

As previously described, the plurality of threads run on the plurality of thread processors 1030. For an embodiment, scheduling of a thread on the thread processors 1030 is based on availability of resources including a thread slot on a thread processor of the plurality of thread processors 1030, adequate space in the register file, space in the output command buffer for writing the commands produced by the spawn instructions. Further, each of the plurality of threads include a set of instructions operating on the plurality of graph streaming processors, wherein the plurality of threads are organized as nodes, wherein each node includes one or more of the plurality of threads with each thread of the node running the same code-block operating on a set of input data and producing (possibly) different output data than other threads of the node.

As described, the plurality of threads is dispatched by the thread manager 320 for operating on the plurality of graph streaming processors 330. For an embodiment, the processing of the plurality of threads for each stage (such as, stage 312) includes storing write commands in the corresponding output command buffer (such as, command buffer 314) when a first node of the plurality of threads of the stage (312) writes greater than a threshold number of write commands for at least one node of a next stage (stage 315), and storing the write commands in the alternate command buffer 311 of the stage 312 when a second node of the stage 312 writes less the threshold number of write commands for at least one other node of the stage 312. Accordingly, when the second node of the stage 312 writes less the threshold number of write commands for at least one other node of the stage 312, then the second node is merged into the stage 312, rather than being a part of a subsequent stage.

As shown, for example, the stage 312 provides threads T0, T1, T2 to the thread processors 330 for processing. During processing of the threads T0, T1, T3 write command(s) are spawned which are written into the alternate command buffer 311, and the output command buffer 314. Note that the stage 312 includes a write pointer (WP) for the output command buffer 314. For an embodiment, the write pointer (WP) updates in a dispatch order. That is, for example, the write pointer (WP) updates when the thread T1 spawned commands are written, even if the thread T1 spawned commands are written after the T2 spawned commands are written. Note that while the command buffer 314 is the output command buffer for the stage 312, the command buffer 314 is the input command buffer for the stage 315.

During processing of the threads by the thread processors 330, data is generated and stored and retrieved in data buffers 360, and data is retrieved from the data buffers 360.

Further, as described, the compiler splits up an initial program into code-blocks to enable/optimize task parallelism of the processing. Each of these code-blocks is a set of instructions and along with its inputs and outputs, identifies a stage for which one or more threads can be managed and run on the thread processors. The thread is a code-block which is scheduled for operation on the plurality of thread processors. As previously described, each thread is a physical instance of a set of instructions (kernel/program/code-block) running on a set of input data and producing (possibly) different output data. A kernel/program can be a code block of a larger program. For an embodiment, the compiler program splits up the program into code-blocks at points where the vector-ness/width of the code changes to enable/optimize task parallelism. The vector-ness/width indicates the degree of parallel processing.

For an embodiment, a node/task is the code-block along with the inputs and outputs. A node can be split up into one or more threads with each thread running the same code-block operating on a set of input data and producing (possibly) different output data. More than one node can be included within a stage. A graph can provide a visual dependency relationship between the nodes. For an embodiment, a stage is a physical piece of hardware in the thread manager which is responsible for scheduling the threads corresponding to the node/s at a particular depth (relative timing of the nodes) in the graph. The stage includes an input command buffer parser. The node generates threads based on the commands in the command buffer.

For an embodiment, the threads running on the thread processors have instructions embedded by the compiler to spawn/create downstream threads. The execution of these instructions results in commands which are placed in the output command buffer of the stage which in turn becomes the input command buffer for the next (later) stage.

For an embodiment, the locations of the command buffers between the stages and the hardware implementation of the stages allows for substantial performance advantages over software implementations of the command buffers and schedulers (stages). For an embodiment, each stage runs concurrently and independently of the actual threads running (be processed) on the processors. These processes and streaming controls implemented in software rather than hardware would require each stage to be a thread which is doing a tremendous amount of work to manage the command buffers, schedule and track the threads. Such a software implementation would kill the whole potential benefit of representing and running an application as a graph of nodes.

For at least some embodiments, each of the plurality of thread processors operates to provide processing updates to the thread manager 320. For an embodiment, the processing update of each thread is specified by commands stored within memory. That is, operational software is programmed and stored in memory that includes a sequence of instructions that instruct each of the threads to provide the processing updates to the thread manager 320. That is, for an embodiment, the dependencies are known a priori and the dependent threads know to provide the response when the response (dependency) has been satisfied. The scorecard provides a way that the dependent thread can determine whether the dependency has been satisfied.

For at least some embodiments, each of the thread processors further operate to provide a completion of execution indicator to the thread manager upon completing execution of the thread of the thread processor.

As previously described, for at least some embodiments, the thread manager continues to dispatch threads as long as at least one of the plurality of thread processors is available regardless of whether dependencies of the dispatched threads have been resolved.

Figure 4:
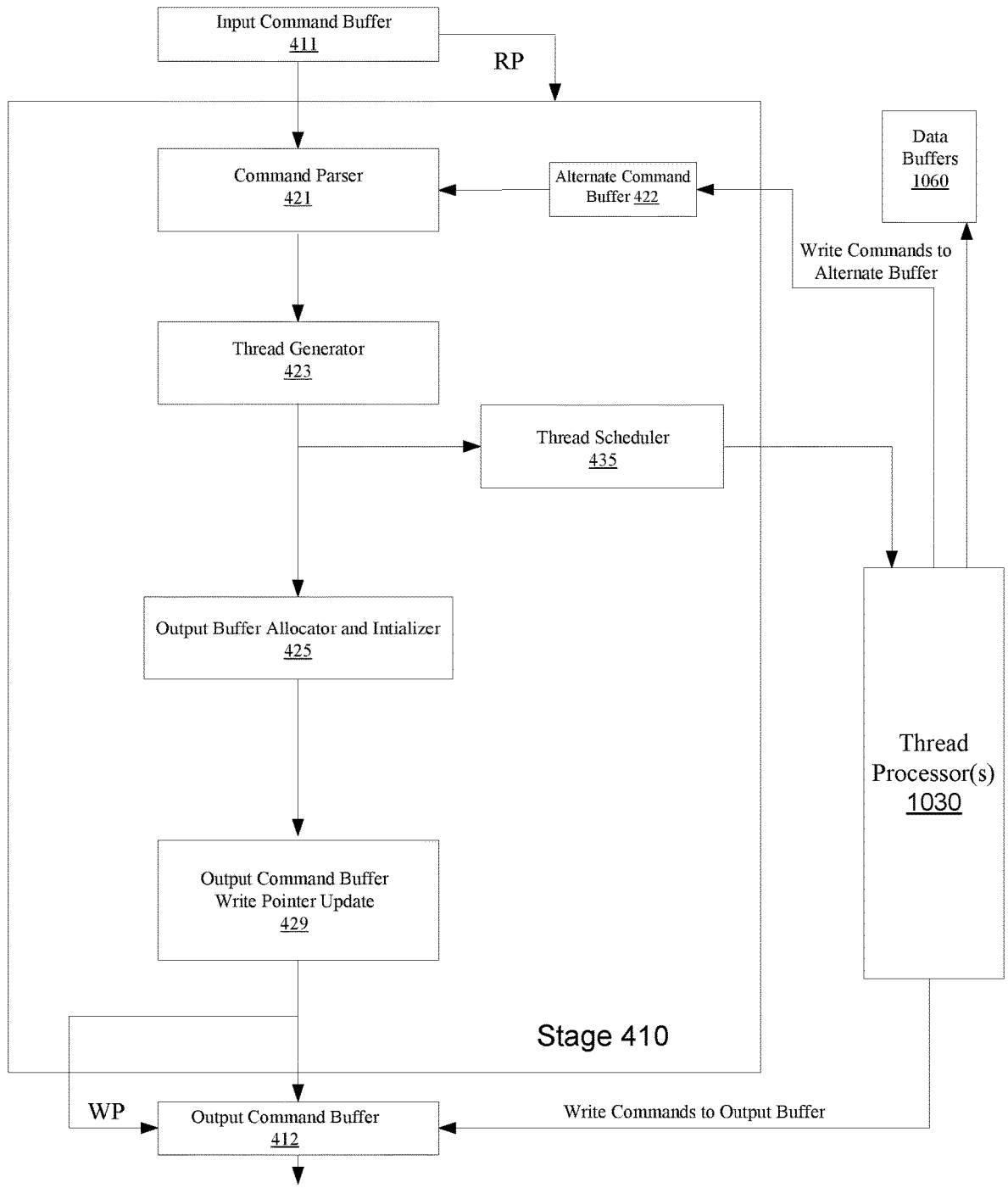
FIG. 4 is a block diagram showing a hardware implementation of a stage of a graph streaming processor, according to an embodiment.

FIG. 4 is a block diagram showing a hardware implementation of a stage 410 of a graph streaming processor, according to an embodiment. The stage receives commands from an input command buffer 411. A command parser 421 parses the command/s from the input command buffer 411. Further, the command parser 421 parses the command/s from the alternate command buffer 422.

A thread generator 423 receives the parsed command/s and generates threads which are provided to the thread processors 1030. A thread scheduler 435 schedules processing of the threads by the thread processors 1030. An output buffer allocator and initializer 425 allocates an upper bound on space needed within the output command buffer for the output commands generated by the thread processors 1030 during processing of the threads. A thread tracker (which can include the previously described scorecard) provide dependency checking of the threads, and provides a dependency response for the threads during processing. An output command buffer write pointer update control 429 provides updates to the write pointer (WP) of the output command buffer 412 and the commands for the output command buffer 412 are generated by the thread processors during processing of the threads.

For an embodiment, each of the functional blocks 421, 422, 423, 425, 429, 435 are implemented in hardware utilizing digital logic gates. That is, the functional blocks are implemented with sequential and combinatorial logic to realize the functionality of the functional blocks 421, 422, 423, 425, 429, 435. As previously described, the implementation of these functional blocks in hardware provides substantial benefits over a software implementation of such functional blocks. For example, each stage commences operation after completion of at least one thread of a previous stage. Accordingly, a plurality of stages that each include processing of a plurality of threads can be simultaneously (in parallel) processing threads of each of the stages.

In summary, for at least some embodiments, each of the stages in the thread manager 320 is responsible for scheduling threads for all the nodes at a particular depth (stage) in a corresponding graph. The scheduling is done by parsing an input command buffer which was written into by threads scheduled by the upstream (previous) stage, or parsing commands written into the alternate command buffer by the same stage. For an embodiment, the hardware management of the command buffer in each stage includes the forwarding of information required by every stage from the input command buffer to the output command buffer, allocation of the required amount of memory (for the output thread-spawn commands) in the output command buffer before scheduling a thread, clearing the allocated memory with dummy entries, writing the thread-spawn command/s initiated from the thread/s running on the thread processor/s into the output command buffer, and managing the write, completion and read pointers into the command buffers.

The write pointer into the command buffer moves during the clearing of the allocated memory with dummy entries before thread dispatch. The write pointer after the completion of the dummy entry writes becomes the future completion pointer for the next stage. The completion pointer is updated after thread completion but in an in-order fashion i.e. the completion pointer updates sequentially in the same temporal order as the dispatch.

Figure 5:
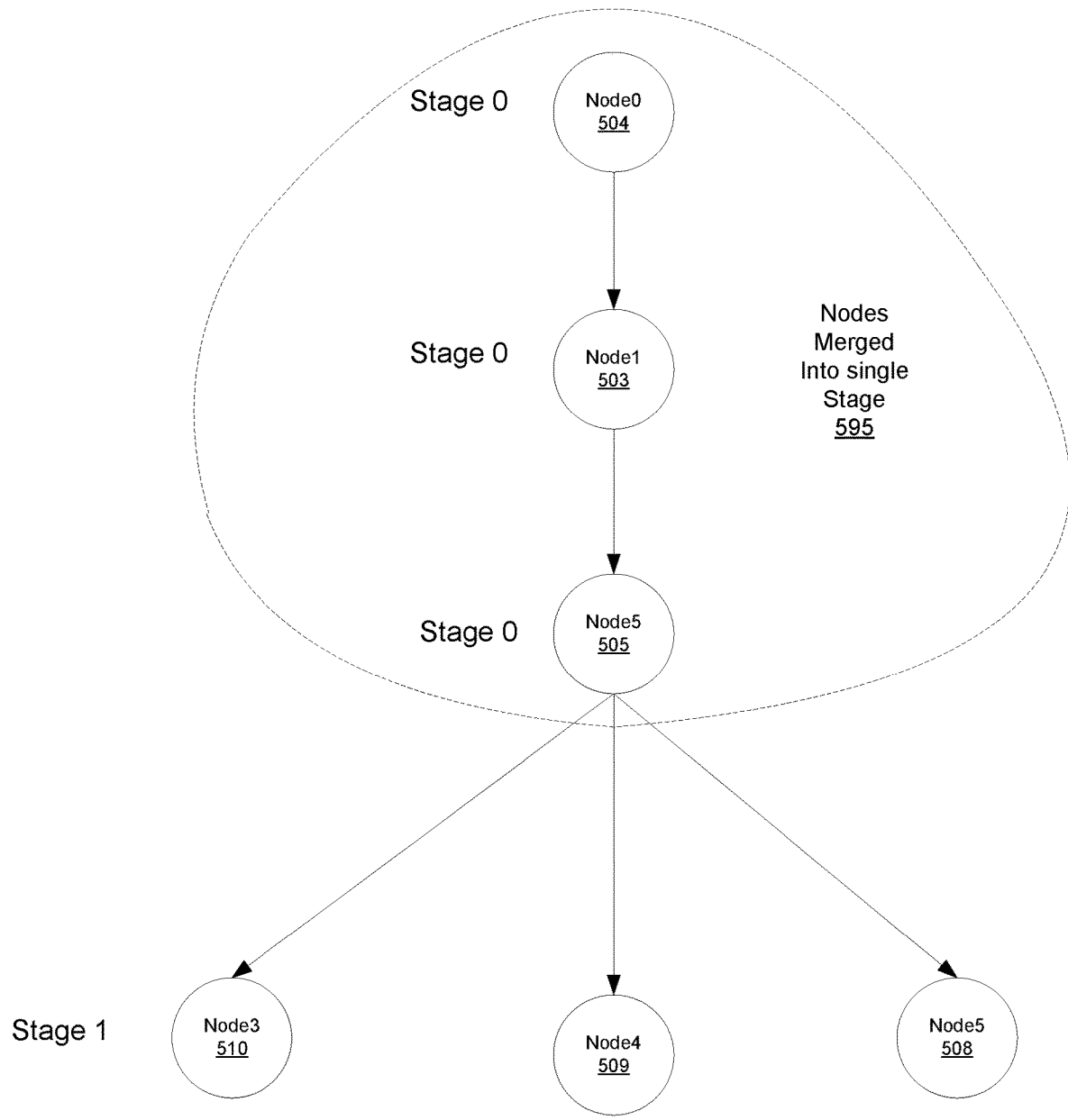
FIG. 5 shows a complex dependent graph that includes merging of nodes into a stage, according to an embodiment.

FIG. 5 shows a complex dependent graph that includes merging of nodes into a stage, according to an embodiment. The complex dependent graph includes nodes 504, 503, 505 which are merged into a single stage (stage 0) 595. As previously described, each stage is implemented in hardware as shown, for example, in FIGS. 3, 4. The stages are included within a thread manager that manages the processing of the threads of the nodes on the plurality of processors. Processing advantages are realized by merging nodes into a single stage. As previously described, for an embodiment, the processing of the plurality of thread for each stage includes storing write commands in the corresponding output command buffer when a first node of the plurality of threads of the stage writes greater than a threshold number of write commands for at least one node of a next stage, and storing the write commands in the alternate command buffer of the stage when a second node of the stage writes less the threshold number of write commands for at least one other node of the stage.

The nodes 504, 503 each write less that the threshold number of write command to corresponding stages 503, 505. For an embodiment, the threshold number or write command is one write command. That is, when the nodes 504, 503 each write one write command to corresponding stages 503, 505, then the corresponding plurality of threads operating on the plurality of processors write the one write command into the alternate command buffer, and the nodes are merged into one stage (stage 0). However, when the nodes 504, 503 each write more than the one write command to corresponding stages 503, 505, then the corresponding plurality of threads operating on the plurality of processors write the more than one write command into the alternate command buffer. As shown, the nodes 504, 503, 505 are merged into the single stage 0.

Further, as shown, the node 505 writes more than the threshold number of write commands to the nodes 508, 509, 510. Accordingly, the threads corresponding to the node 505 write the greater than the threshold number of write commands for the nodes 508, 509, 510 into the output command buffer of the stage (stage 0) of the node 505. Note that the output command buffer of the stage (stage 0) of the node 505 is the input command buffer of the stage (stage 1) of the nodes 508, 509, 510.

Figure 6:
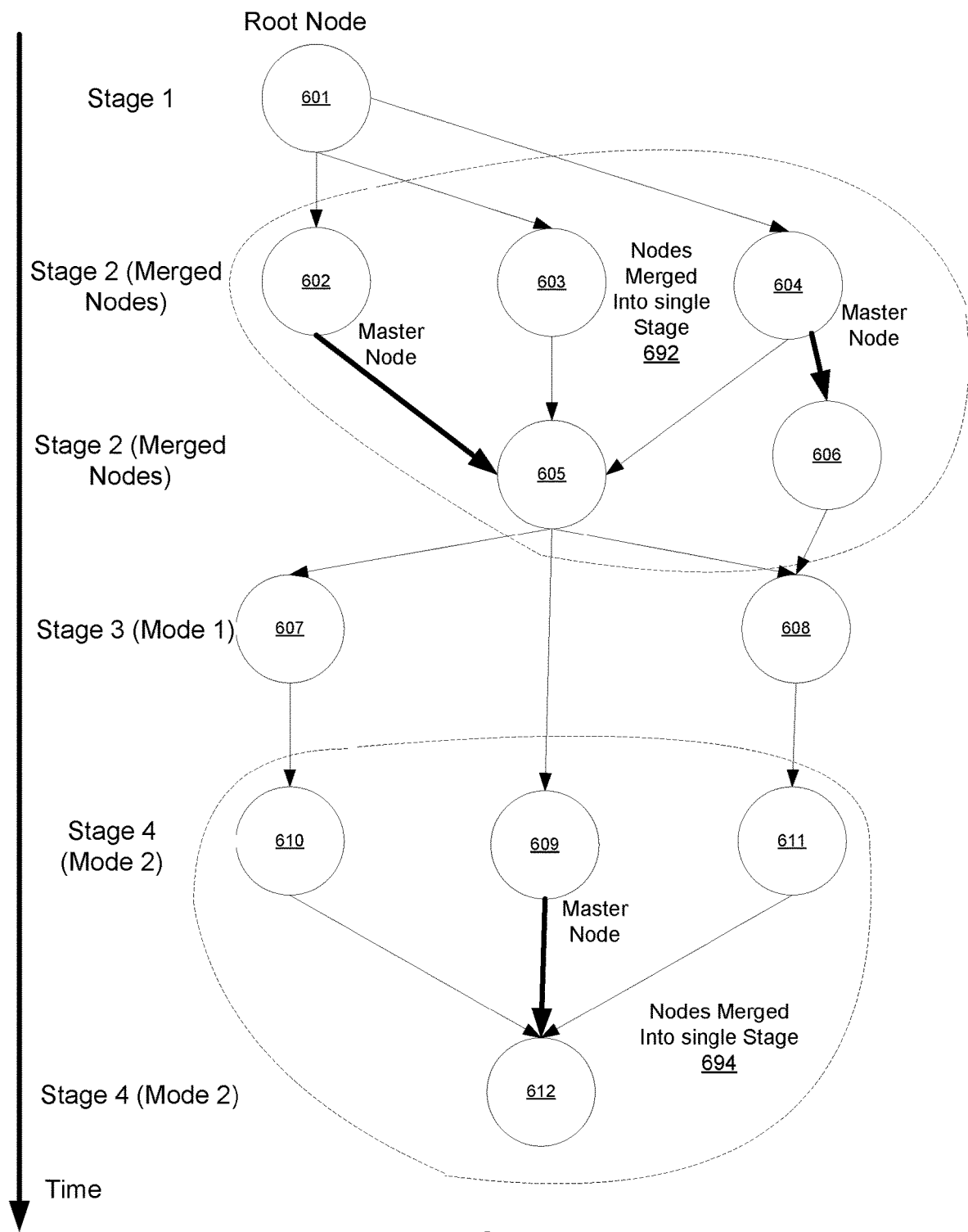
FIG. 6 shows another complex dependent graph that includes merging of nodes into a stage, according to an embodiment.

FIG. 6 shows another complex dependent graph that includes merging of nodes into a stage, according to an embodiment. FIG. 6 shows that for at least some embodiment, the number of write commands generated by the threads of a node determines whether nodes are merged into a common stage.

A first node 601 writes greater than a threshold number of write commands for the nodes 602, 603, 604. Therefore, the processing of the threads of the node 601 managed by its own stage (stage 1). The node 601 of stage 1 writes commands into the input command buffer of the stage 2.

The stage 2 of FIG. 6 shows that for at least some embodiments, nodes are designated as master nodes. For example, nodes 602, 604 are designated as master nodes. For an embodiment, a node is designated as a master node when that node is the only node generating write commands for a subsequent node. For example, node 602 generates write command for the node 605. Nodes 603, 604 do not generate write commands for the nodes 605. The nodes 603, 604 only generate data for the node 605.

Further, as shown, the node 605 is merged into stage 2 because the node 602 writes less than the threshold number of write command for the node 605. Accordingly, the threads of the node 602 write the write command(s) into an alternate command buffer of the stage 2. The command parser of the stage 2 then parses the commands written into the alternate command buffer of the stage 2 for generating additional threads for the processing of the stage 2.

Further, as shown, the node 606 is merged into stage 2 because the master node 604 writes less than the threshold number of write command for the node 606. Accordingly, the threads of the node 604 write the write command(s) into an alternate command buffer of the stage 2. The command parser of the stage 2 then parses the commands written into the alternate command buffer of the stage 2 for generating additional threads for the processing of the stage 2.

As shown, the nodes 605, 606 write more than the threshold number of write commands for the nodes 607, 608 of the stage 3. Therefore, these write commands are written into the output command buffer of the stage 2, which is the input command buffer for stage 3.

As shown, the nodes 607, 608 write more than the threshold number of write commands for the nodes 610, 609, 611 of the stage 4. Therefore, these write commands are written into the output command buffer of the stage 3, which is the input command buffer for stage 4.

Further, as shown, the nodes 610, 609, 611 write fewer than the threshold number of write commands to the node 612. Here, node 609 is designated as the master node which writes the command for the node 612. The nodes 610, 611 only generate data for the node 612. Accordingly, the node 612 is merged 694 into the same stage (stage 4) as the nodes 610, 609, 611. Accordingly, these write commands are written into the alternate command buffer of the stage 4, rather than to, for example, the input command buffer of a stage 5.

The nodes of FIG. 6 have been designated as operating in a first mode when the nodes of a stage write only into the output command buffer of the stage rather than also writing to the alternate command buffer. The nodes have been designates as operating in a second mode when the nodes of the stage write into both the output command buffer of the stage and also write into the alternate command buffer of the stage.

With the described embodiments for merging nodes into stages, depth limitation of the graph streaming processing can be mitigated. An embodiment includes a new emit mode added to an EMIT instruction called EMIT Immediate. For an embodiment, instead of storing the information (write commands) in the output command buffer of an operating stage, the information (write commands) are stored in the alternate command buffer.

For an embodiment, once a parent thread is completed (no more instructions to process for that thread) the thread is removed from the alternate command buffer and a new thread is created for the next node and dispatched immediately. from the same stage.

Owing to the fact that the new thread is dispatched from the same stage, the described embodiments provide infinite graph depth. All the nodes can be accumulated and processed within the same stage. As same stage is being used virtually, no new physical stage is involved. The processing of the threads progressed to a next stage only when there are multiple child nodes and one thread create multiple child threads, which can be referred to as "forking". In such cases, the output command buffer is used.

For this described embodiment, the new thread is immediately dispatched for processing (that is, in the next clock cycle). Therefore, this provides better cache hits, as there is higher probability that previous node's data will be available in cache, as the previous node's processed data will act as input for the next node. In other words, the data is streamlined better, as the threads are immediately dispatched. Hence the processing speed is faster and offers higher performance.

Since the storage of the write commands is in the alternate command buffer and there is no output command buffer involved, storage space is also saved. This provides the ability to reduce the cache size.

On-chip cache in ASIC (application specific integrated circuits) is very expensive. The smaller the cache, the smaller the area on the ASIC and less the consumed power. Further, the latency to store and fetch the data in/from cache can be avoided. This results in better performance by lowering execution time.

The described embodiments that include the virtual staging (merging of nodes into stages) offer better performance of processing. Resources are utilized efficiently and there are fewer unnecessary stalls, unnecessary idles, and resource underutilization.

Figure 7:
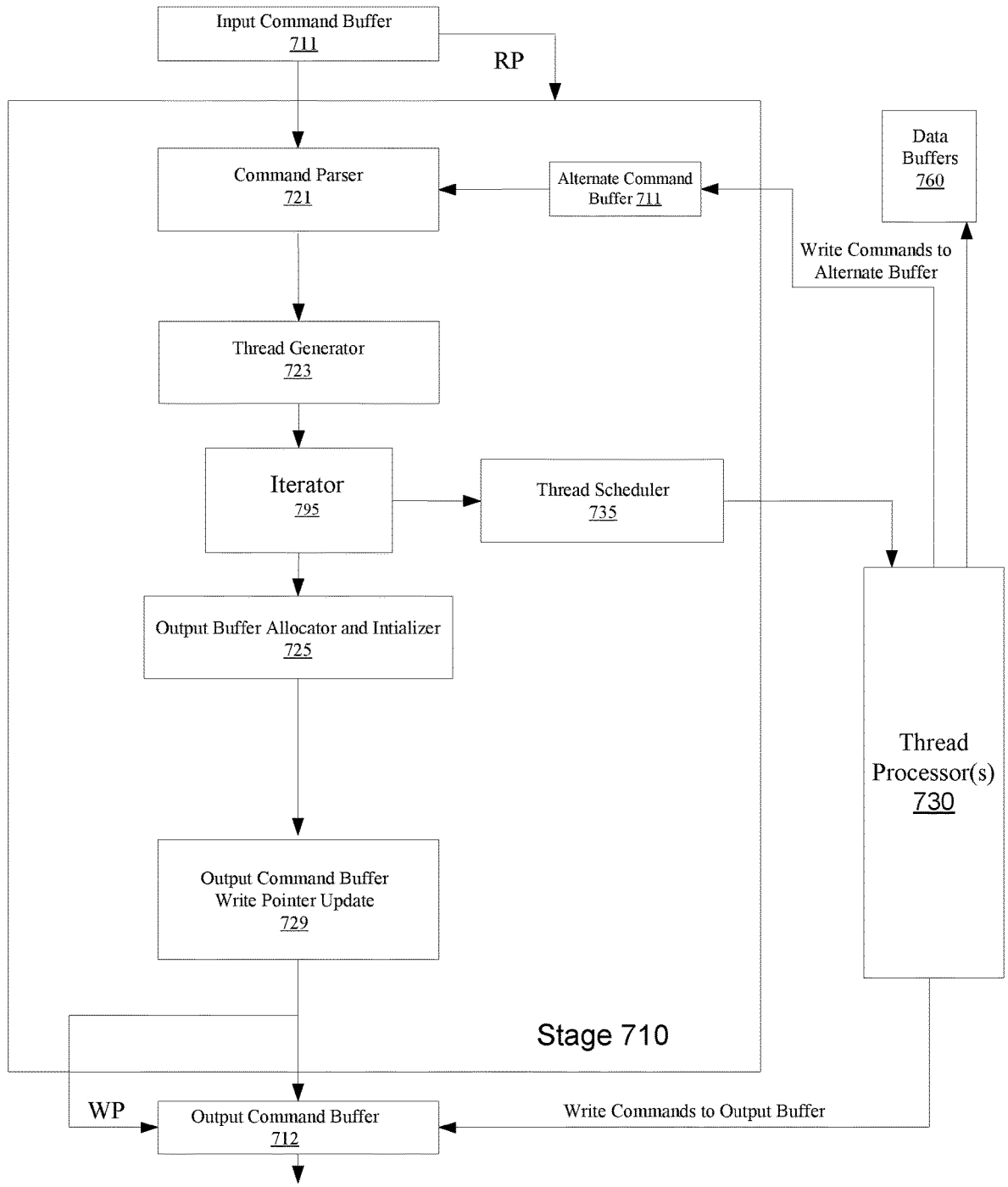
FIG. 7 is another block diagram showing a hardware implementation of a stage of a graph streaming processor, according to an embodiment.

FIG. 7 is another block diagram showing a hardware implementation of a stage of a graph streaming processor, according to an embodiment. This embodiment further includes an iterator 795. That is, the scheduler further includes an iterator, the iterator operative to generate a plurality of threads of a next stage based on the write commands stored in the corresponding output command buffer. For at least some embodiments, write commands written into the alternate command buffer are not fragmented into another plurality of threads by the iterator. For at least some embodiments, write commands written into the corresponding output command buffer are fragmented into the plurality of threads of the next stage by the iterator.

For an embodiment, each command has an index and a size. Further, for an embodiment, the command also includes the desired dispatch size of each thread which is used by the iterator to break down (fragment) the command into multiple threads.

Figure 8:
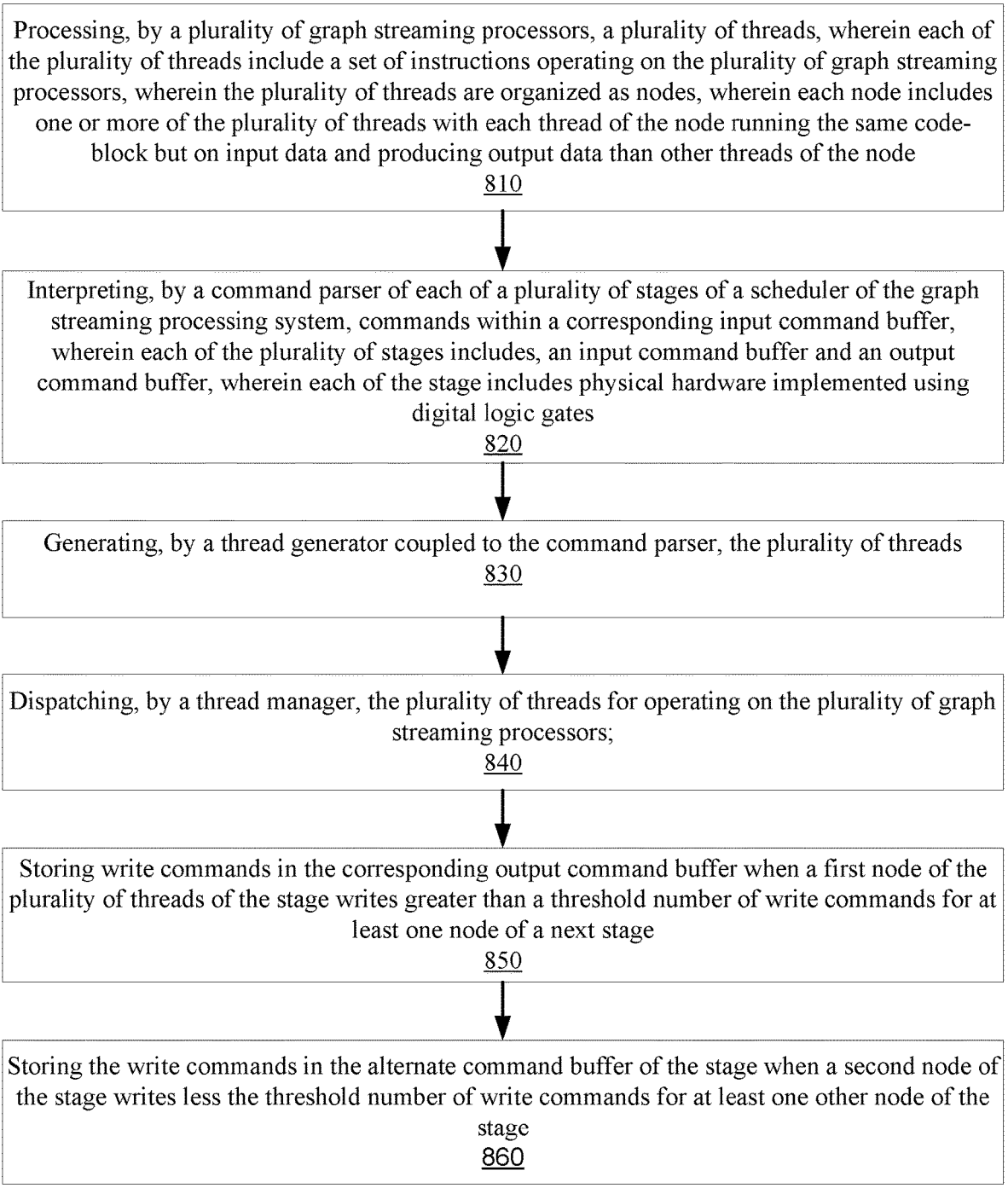
FIG. 8 is a flow chart that includes steps of a method of reduced stage graph processing, according to an embodiment.

FIG. 8 is a flow chart that includes steps of a method of reduced stage graph streaming processing, according to an embodiment. A first step 810 includes processing, by a plurality of graph streaming processors, a plurality of threads, wherein each of the plurality of threads include a set of instructions operating on the plurality of graph streaming processors, wherein the plurality of threads are organized as nodes, wherein each node includes one or more of the plurality of threads with each thread of the node running the same code-block but on input data and producing output data than other threads of the node. A second step 820 includes interpreting, by a command parser of each of a plurality of stages of a scheduler of the graph streaming processing system, commands within a corresponding input command buffer, wherein each of the plurality of stages includes, an input command buffer and an output command buffer, wherein each of the stage includes physical hardware implemented using digital logic gates. A third step 830 includes generating, by a thread generator coupled to the command parser, the plurality of threads. A fourth step 840 includes dispatching, by a thread manager, the plurality of threads for operating on the plurality of graph streaming processors. The processing of the plurality of thread for each stage includes a fifth step 850 of storing write commands in the corresponding output command buffer when a first node of the plurality of threads of the stage writes greater than a threshold number of write commands for at least one node of a next stage, and sixth step 860 of storing the write commands in the alternate command buffer of the stage when a second node of the stage writes less the threshold number of write commands for at least one other node of the stage.

At least some embodiments further include interpreting, by the command parser, the write commands stored in the alternate command buffer of the stage. At least some embodiments further include interpreting, by the command parser, the write commands stored within the alternate command buffer and the input write commands stored in the input command buffers.

At least some embodiments further include designating at least one node of each stage as a master node, and generating, by the master node, a write command for another node. For an embodiment, the other node is of the next stage when the at least one node of each stage of the plurality of threads of the stage writes greater than a threshold number of write commands to an input command buffer for the next stage. For an embodiment, the other node is of a same stage as the at least one node of each stage when the at least one node of the plurality of threads of the stage writes less than a threshold number of write commands to the alternate command buffer of the stage of the other node.

At least some embodiments further include generating, by an iterator of the scheduler, a plurality of threads of a next stage based on the write commands stored in the corresponding output command buffer. For an embodiment, write commands written into the alternate command buffer are not fragmented into another plurality of threads by the iterator. For at least some embodiments, write command written into the corresponding output command buffer are fragmented into the plurality of threads of the next stage by the iterator.

For an embodiment, the output command buffer of a stage operates as the input command buffer of a subsequent stage.

Although specific embodiments have been described and illustrated, the described embodiments are not to be limited to the specific forms or arrangements of parts so described and illustrated. The embodiments are limited only by the appended claims.

What is claimed:
1. A graph streaming processing system, comprising:
a plurality of graph streaming processors operative to process a plurality of threads, wherein each of the plurality of threads include a set of instructions operating on the plurality of graph streaming processors, wherein the plurality of threads are organized as nodes, wherein each node includes one or more of the plurality of threads with each thread of the node running the same code-block operating on a set of input data and producing output data;
a scheduler comprising a plurality of stages, wherein each of the plurality of stages includes, an input command buffer and an output command buffer;
each stage comprising:
a command parser operative to interpret commands within a corresponding input command buffer;
an alternate command buffer;
a thread generator coupled to the command parser operative to:
generate the plurality of threads;
dispatch the plurality of threads for operating on the plurality of graph streaming processors;
where the processing of the plurality of threads for each stage includes storing write commands in the corresponding output command buffer when a first node of the plurality of threads of the stage writes greater than a threshold number of write commands for at least one node of a next stage, and storing the write commands in the alternate command buffer of the stage when a second node of the stage writes less the threshold number of write commands for at least one other node of the stage.

2. The graph streaming processor of claim 1, wherein the command parser is further operative to interpret the write commands stored in the alternate command buffer of the stage.

3. The graph streaming processor of claim 1, wherein at least one node of each stage is designated as a master node, wherein the master nodes generate a write command for another node.

4. The graph streaming processor of claim 3, wherein the other node is of the next stage when the at least one node of each stage of the plurality of threads of the stage writes greater than a threshold number of write commands for the other stage.

5. The graph streaming processor of claim 3, wherein the other node is of a same stage as the at least one node of each stage when the at least one node of the stage of the plurality of threads of the stage writes less than a threshold number of write commands for the other node.

6. The graph streaming processor of claim 1, wherein the scheduler further comprises an iterator, the iterator operative to generate a plurality of threads of a next stage based on the write commands stored in the corresponding output command buffer.

7. The graph streaming processor of claim 6, wherein write commands written into the alternate command buffer are not fragmented into another plurality of threads by the iterator.

8. The graph streaming processor of claim 6, wherein write commands written into the corresponding output command buffer are fragmented into the plurality of threads of the next stage by the iterator.

9. The graph streaming processor of claim 1, wherein the output command buffer of a stage operates as the input command buffer of a subsequent stage.

10. The graph streaming processor of claim 1, wherein the command parser is further operative to interpret the write commands stored within the alternate command buffer and input write commands stored in the input command buffer.

11. A method of graph streaming processing, comprising:
processing, by a plurality of graph streaming processors, a plurality of threads, wherein each of the plurality of threads include a set of instructions operating on the plurality of graph streaming processors, wherein the plurality of threads are organized as nodes, wherein each node includes one or more of the plurality of threads with each thread of the node running the same code-block operating on a set of input data and producing output data;
interpreting, by a command parser of each of a plurality of stages of a scheduler of the graph streaming processing system, commands within a corresponding input command buffer, wherein each of the plurality of stages includes, an input command buffer and an output command buffer;
generating, by a thread generator coupled to the command parser, the plurality of threads;
dispatching, by a thread manager, the plurality of threads for operating on the plurality of graph streaming processors;
wherein the processing of the plurality of threads for each stage comprises:
storing write commands in the corresponding output command buffer when a first node of the plurality of threads of the stage writes greater than a threshold number of write commands for at least one node of a next stage; and
storing the write commands in the alternate command buffer of the stage when a second node of the stage writes less the threshold number of write commands for at least one other node of the stage.

12. The method of claim 11, further comprising interpreting, by the command parser, the write commands stored in the alternate command buffer of the stage.

13. The method of claim 11, further comprising designating at least one node of each stage as a master node, and generating, by the master node, a write command for another node.

14. The method of claim 13, wherein the other node is of the next stage when the at least one node of each stage of the plurality of threads of the stage writes greater than a threshold number of write commands for the other stage.

15. The method of claim 13, wherein the other node is of a same stage as the at least one node of each stage when the at least one node of the stage of the plurality of threads of the stage writes less than a threshold number of write commands for the other node.

16. The method of claim 11, further comprising generating, by an iterator of the scheduler, a plurality of threads of a next stage based on the write commands stored in the corresponding output command buffer.

17. The method of claim 16, wherein write commands written into the alternate command buffer are not fragmented into another plurality of threads by the iterator.

18. The method of claim 16, wherein write commands written into the corresponding output command buffer are fragmented into the plurality of threads of the next stage by the iterator.

19. The method of claim 11, wherein the output command buffer of a stage operates as the input command buffer of a subsequent stage.

20. The method of claim 11, further comprising interpreting, by the command parser, the write commands stored within the alternate command buffer and the input write commands stored in the input command buffers.

* * * * *